M. PFAU.
TYPE.
APPLICATION FILED FEB. 28, 1911.
1,018,985.
Patented Feb. 27, 1912.
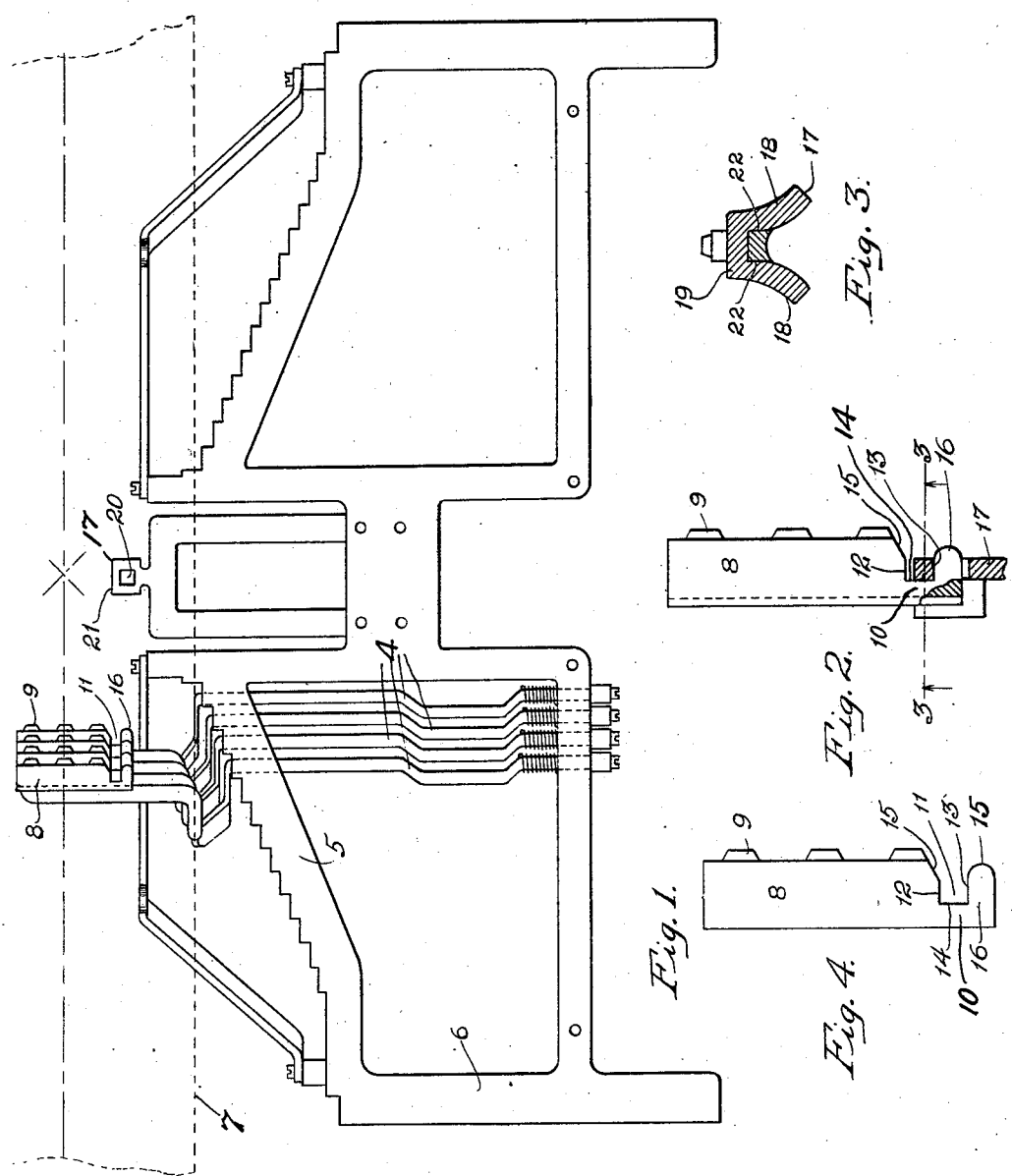
Witnesses:
Inventor:
Max Pfau,
By Banning & Banning
Attorneys.

UNITED STATES PATENT OFFICE.

MAX PFAU, OF WOODSTOCK, ILLINOIS, ASSIGNOR TO EMERSON TYPEWRITER CO., OF WOODSTOCK, ILLINOIS, A CORPORATION OF ILLINOIS.

TYPE.

1,018,985.

Specification of Letters Patent.

Patented Feb. 27, 1912.

Application filed February 28, 1911. Serial No. 611,440.

*To all whom it may concern:*

Be it known that I, MAX PFAU, a citizen of Saxony, Germany, residing at Woodstock, in the county of McHenry and State of Illinois, have invented certain new and useful Improvements in Type, of which the following is a specification.

The present invention relates to type more especially adapted for use on typewriters or analogous machines.

The objects of the present invention are, to form a centering member for the type, which will be integral with the body of the type, and which will be formed by the minimum number of machining operations.

Another object of the invention is, to provide a centering member which will lie in close proximity to the character-bearing surfaces of the type, whereby the point on the type where the centering operation takes place will be adjacent the writing line, this having been found to produce a more accurate centering.

Further objects of the invention are, to form the centering member so that it will be composed of a series of flat, firm faces adapted to engage with a series of flat faces on a fixed centering member located adjacent the platen of the machine; to form a series of beveled edges on the type, which will insure the easy insertion and withdrawal of the centering member on the type from the fixed centering member located adjacent the platen of the machine; and to arrange the type and fixed centering member so that a substantial amount of the type will be engaged by the fixed centering member.

The invention further relates to the features of construction and the combination of parts hereinafter described and claimed.

In the drawings, Figure 1 is a view showing the type of the present invention as applied to one form of typewriting machine; Fig. 2, a detail showing the type member in operative relation with the fixed centering member of a typewriting machine; Fig. 3, a section on line 3—3 of Fig. 2, looking in the direction of the arrow; and Fig. 4, an enlarged detail of the type member.

In typewriting machines, it has been found necessary to employ some means for centering the type just before it strikes the ribbon to perform the printing operation, this centering being for the purpose of bringing the type into proper alinement with the printing point, as in the travel of the type from its normal position to its writing position, especially where a relatively long distance is traveled, the type is liable to become misalined and the characters when printed will be crooked or disordered in formation, which is undesirable. It is, of course, essential to the successful operation of these devices to have the centering member accurate. If this accuracy is not maintained, the centering device is a hindrance, rather than a help, in perfecting the operation of the machine. Consequently, it is of material advantage to form this centering member with as few machining operations as possible, since the greater number of machining operations which have to be gone through with, the greater is the liability of some imperfection occurring which will destroy the utility of the device. It is further of material advantage to form the centering member integral with the body of the type. This eliminates the insertion of a pin or analogous device and the consequent drilling of holes for their insertion, which not only materially weakens the type-bar or type structure, depending upon which the pin is entered into, but requires a second machining operation, which, as heretofore described, is not desirable. These centering devices have been found to operate more successfully when the centering member is located close to the type characters, as this brings the point of centering closer to the writing line and prevents any side or flexing movement of the type after the centering operation has been performed.

For the purposes of illustration, I have shown in Fig. 1 the type of the present invention as applied to one form of type-bar. It is understood, however, that this particular form of type-bar and its mounting is not claimed as a portion of the present invention and is merely shown for illustrative purposes. The type-bar, as shown in Fig. 1, consists of a rod-like member 4, which is mounted within the rails 5 of a supporting framework 6, the framework being mounted in suitable operative position with respect to the platen 7.

The type member which constitutes the subject-matter of the present invention has a block-like body portion 8, which is provided along one face with a series of character surfaces 9 of any suitable form and size. The block, as shown in the drawings, is longer than is necessary for the accommodation of these characters, and this excess length may be termed an extension 10, which runs from the lower edge of the last character to the lower edge of the block. This extension, it will be understood, is a portion of the block itself and is simply referred to as an extension for clearness in setting forth the present invention. By the provision of the extension, a surface is provided which is not utilized by the type characters, and into this surface is cut a notch 11, which is bounded by an upper face 12, a lower face 13, and an inner face 14, all of the faces being flat surfaces; and the faces 12 and 13 may, if desired, terminate in suitable bevels 15. The cutting of the notch 11 forms a rectangular finger-like member 16 at the lower end of the type member. This finger-like member 16 is what will be hereinafter termed the centering member carried by the type. The side faces of this centering member are flush with the side faces of the type body. That is, the centering member is of the same breadth as the breadth of the type body and has a continuous flat face on each side thereof. By forming the centering member in this manner, it can be produced by one machining operation. A single action of a die press to form the notch 11 is all that is necessary. There is no grinding of parts or no secondary machining operation to be gone through with. It is obvious that by this method the maximum degree of accuracy can be obtained, since the liability of malformation is materially less in a single machining operation than with a multiplicity of such operations, and, of course, the cost of manufacture is materially reduced.

Located adjacent the platen of the machine and adjacent the printing point, which is indicated by "X" in Fig. 1, is what will be termed the fixed centering member 17, which consists of a U-shaped member having side walls 18 and a rear wall 19. This U-shaped member is provided with a square opening 20 of a size to accommodate the finger-like member 16, which opening, as shown in Fig. 1, is located adjacent the upper end of said member and provides a web 21 on the upper end of the centering member 17. When the type is swung into operative position, the web 21 will enter the opening 11 and the finger-like member 16 will enter the opening 20.

As shown in Fig. 2, there is preferably provided a slight space between the lower end of the finger-like member 16 and the lower wall of the opening 20, also a slight space between the upper wall of the slot 11 and the upper wall of the web 21, the main centering operation being performed by the lower wall of the slot 11 and the upper wall of the opening 20. This matter of the relation of the engaging surfaces, however, may be changed to comply to whichever construction is deemed more expedient.

The fixed centering member, as shown more clearly in Fig. 3, has two opposed flat inner side faces 22, adapted to engage with the side faces of the type member 8. The engaging surfaces on the flat side faces of the type member and the flat side faces of the centering member 17 are substantially large. As will be seen from the drawings, they extend from the upper edge of the notch 11 to the lower edge of the block composing the type member. This is deemed to be of material importance, since it gives an extremely firm and substantial engagement between a series of flat faces, so that the type member is accurately and firmly alined and is held against any flexing or vibratory movement which would tend to throw it out of line just as it performed the printing operation.

I claim:

1. In a typewriter, the combination of a type member, comprising a block-like body portion provided with a character-bearing surface and an extension portion, the extension portion having a notch cut therein, which produces a flat faced centering member thereon, a fixed centering member adjacent the platen of the machine, provided with an opening adapted to receive the centering member on the type, said fixed centering member being provided with flat inner side faces adapted to engage the flat outer side faces of the body portion of the type, substantially as described.

2. In a typewriter, the combination of a type member, comprising a block-like body portion, provided with a character-bearing surface and an extension portion, the extension portion having a rectangular notch cut therein, which produces a flat faced finger-like centering member at the lower end of the body portion, a fixed centering member adjacent the platen of the typewriter, provided with an opening therein to receive the centering member on the type, and provided with a webbed portion adapted to receive the notch in the type, said fixed centering member being provided with flat inner side faces adapted to engage the flat outer side faces of the body portion of the type, substantially as described.

MAX PFAU.

Witnesses:
Wm. P. Bond,
Frank Wilder.

Copies of this patent may be obtained for five cents each, by addressing the "Commissioner of Patents, Washington, D. C."